United States Patent [19]

Takada

[11] Patent Number: 5,038,228
[45] Date of Patent: Aug. 6, 1991

[54] SHEET TRANSPORT APPARATUS OF PRINTER HAVING SCANNER UNIT

[75] Inventor: Hiromi Takada, Yokohama, Japan

[73] Assignee: Ricoh Company, Ltd., Tokyo, Japan

[21] Appl. No.: 525,086

[22] Filed: May 16, 1990

[30] Foreign Application Priority Data

May 18, 1989 [JP] Japan ................................ 1-124778

[51] Int. Cl.[5] ............................................. H04N 1/00
[52] U.S. Cl. ................................... 358/498; 271/186;
271/306; 346/160; 355/233; 355/308; 358/474
[58] Field of Search ............... 355/200, 210, 271, 274,
355/308, 317, 318, 321, 233, 202; 271/306, 186;
358/474, 496, 498; 346/160

[56] References Cited

U.S. PATENT DOCUMENTS

| | | | |
|---|---|---|---|
| 4,682,876 | 7/1987 | Ohtsuka et al. | 355/3 R |
| 4,696,562 | 9/1987 | Urata et al. | 355/3 R |
| 4,734,738 | 3/1988 | Yamanaka et al. | 355/318 |
| 4,754,337 | 6/1988 | Nohtomi et al. | 358/498 |
| 4,925,178 | 5/1990 | Clabbers et al. | 271/186 |
| 4,956,676 | 9/1990 | Fukae et al. | 355/271 |

FOREIGN PATENT DOCUMENTS

| | | |
|---|---|---|
| 0174113 | 3/1986 | European Pat. Off. . |
| 0229904 | 7/1987 | European Pat. Off. . |
| 2205276 | 12/1988 | United Kingdom . |
| 2217261 | 10/1989 | United Kingdom . |

Primary Examiner—A. T. Grimley
Assistant Examiner—Sandra L. Hoffman
Attorney, Agent, or Firm—Cooper & Dunham

[57] ABSTRACT

A laser beam printer having a scanner unit and a sheet transport apparatus for use with the scanner unit. The printer includes a sheet feeding part, a photosensitive medium, a transfer part, an upper cover and a scanner unit, the transfer part being provided at an upper portion of the photosensitive medium. The sheet transport apparatus includes an upper transport path for transporting a record sheet from the sheet feeding part to the transfer part of the printer. The sheet transport apparatus further includes a transport path where the scanner unit is provided, the transport path being provided within the upper cover.

6 Claims, 7 Drawing Sheets

FIG. I

SHEET TRANSPORT APPARATUS OF PRINTER HAVING SCANNER UNIT

BACKGROUND OF THE INVENTION

The present invention relates to sheet transport apparatus of a printer having a scanner unit in which an upper transport path is provided to extend from a sheet feeding part to an image transfer part arranged over a photosensitive medium.

In general, a printer during operation transports a record sheet from a sheet feeding part to a transfer part through a given transport path, and the transfer part of the printer transfers a visible image formed with toner on a photosensitive medium to the record sheet. The visible image is formed on and carried by the photosensitive medium in accordance with image information. In this type of the printer, the transfer part of the printer is arranged on an upper side of the photosensitive medium, and the sheet feeding part is provided on a lower side of the photosensitive medium. An upper transport path is provided to send a record sheet from the sheet feeding part on a lower side of the printer to the transfer part on an upper side of the printer. This type of the printer is hereinafter referred to as an upper transport type printer.

Conventionally, in order to incorporate a scanner function to the printer, a scanner unit and an image processing unit for processing image readout signals from the scanner unit and sending the signals to the printer are attached to the printer such as the upper transport type printer to constitute an image forming system. In such a conventional image forming system, the printer must be provided with a separate scanner unit and a separate image processing unit. However, there are many inconveniences in using that image forming system to record an image on the sheet, for example, a need of complicated operations, a bulky system size, and a total cost of the printer, the scanner unit and the others becoming unnecessarily high.

SUMMARY OF THE INVENTION

Accordingly, it is a general object of the present invention to provide a novel and useful sheet transport apparatus of a printer having a scanner unit, in which the above described problems are eliminated.

Another and more specific object of the present invention is to provide a sheet transport apparatus of a printer having a scanner unit, in which the existing parts and space of the scanner built-in printer are commonized to attain an inexpensive cost and a compact size of the printer.

Still another object of the present invention is to provide a sheet transport apparatus of a printer which has a sheet feeding part, a photosensitive medium, a transfer part, an upper cover and a scanner unit, the transfer part being provided at an upper portion of the photosensitive medium. The sheet transport apparatus includes an upper transport path for transporting a record sheet from the sheet feeding part to the transfer part, and a first transport path where the scanner unit is provided, the upper cover being provided to allow the upper transport path to be opened to the external of the printer, the first transport path being provided within the upper cover. According to the present invention, the upper cover is exchangeable between an upper cover having the scanner unit and an upper cover having no scanner unit, and it is possible to readily assort the printer specifications in assembly line into a group with the scanner unit and the other group without the scanner unit. Hence, it will make it possible to attain an inexpensive cost of the scanner built-in printer and a compact size of the printer.

Other objects and further features of the present invention will be apparent from the following detailed description when read in conjunction with the accompanying drawings.

DESCRIPTION OF THE PREFERRED EMBODIMENTS

Figure 1:
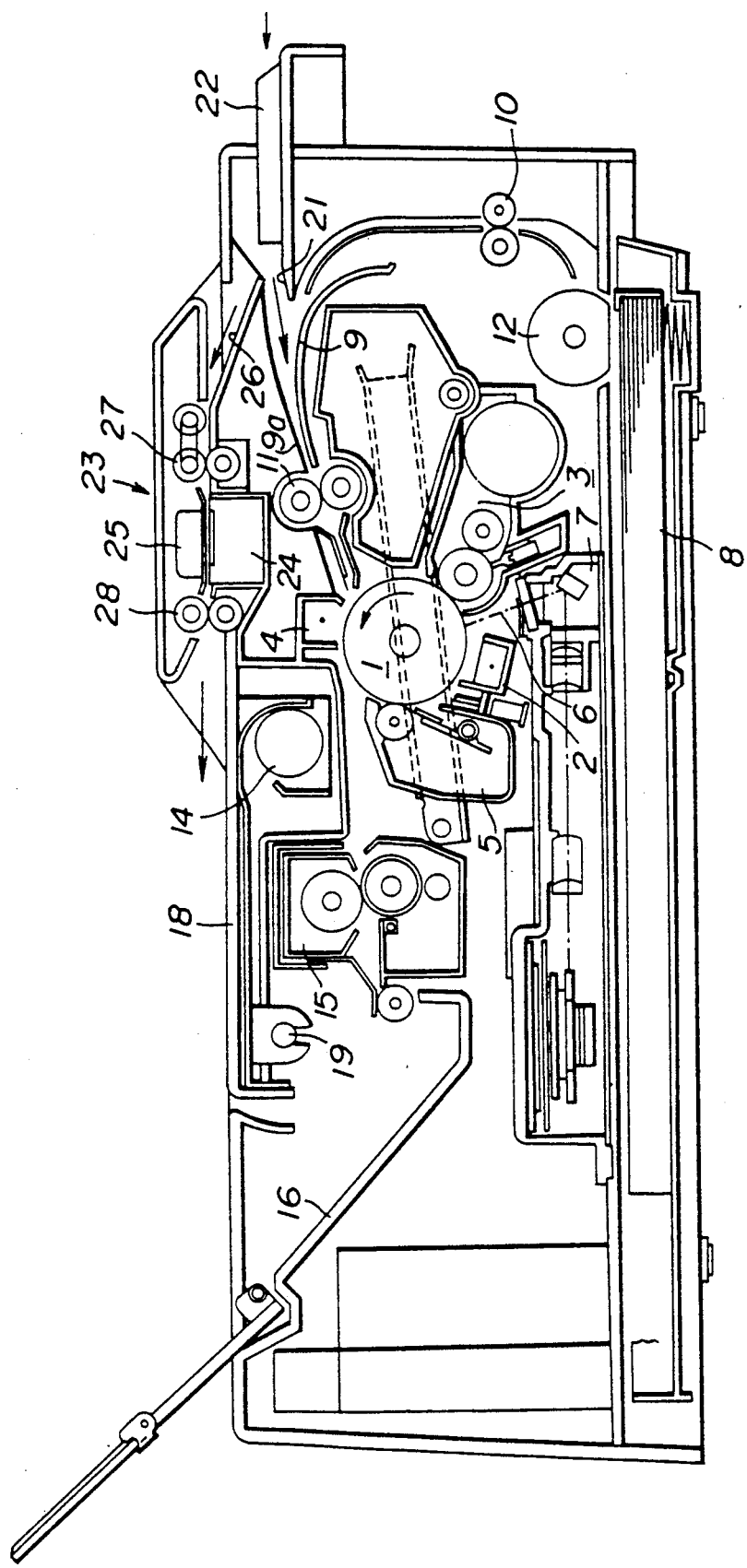
FIG. 1 is a sectional side view of a first embodiment of a laser printer having a scanner unit according to the present invention, with its upper cover in a closed position.

Referring now to FIG. 1, a description will be given of a first preferred embodiment of a laser printer which incorporates a scanner unit according to the present invention. As shown, a drum type photosensitive medium 1 is provided in the midst of the printer. The photosensitive medium 1 is driven to rotate in a direction indicated by an arrow in FIG. 1 and serves as an electrostatic latent image carrier. Around the drum type photosensitive medium 1, an electrostatic charger 2, a developing unit 3, a transfer charger 4, and a cleaning unit 5 are arranged in this order in the rotating direction of the photosensitive medium 1. The electrostatic charger 2 charges electrostatically a surface of the photosensitive medium 1 in a uniform condition. The developing unit 3 supplies a toner and develops an electrostatic latent image formed on the surface of the photosensitive medium 1 into a visible image with the toner. The transfer charger 4 transfers the visible image produced by the developing unit 3 to a record sheet which is supplied from a sheet feeding mechanism of the printer described below. And the cleaning unit 5 removes residual toner from the surface of the photosensitive medium 1 after the image is transferred to the record sheet. Further, a laser optical path 6 is provided at a place between the electrostatic charger 2 and the developing unit 3. A laser optical system 7 is provided under the photosensitive medium 1, which writes image information on the photosensitive medium 1 and forms a latent image thereon. A laser beam sent from the laser optical system 7 passes in the optical path 6 and is cast on the photosensitive medium 1 for the exposure.

The electrostatic charger 2 and the laser optical path 6 are provided under the photosensitive medium 1, and the laser optical system 7 is mounted at a position under the photosensitive medium 1, the developing unit 3 and the cleaning unit 5. The transfer charger 4 is provided on an upper side of the photosensitive medium 1, and an image transfer part which is formed with the transfer charger 4 is arranged at an upper portion of the photosensitive medium 1. A sheet feeding cassette 8 which serves to accommodate record sheets for sending them to an automatic sheet feeding part is arranged approximately in a horizontal position under the laser optical system 7. An upper transport path 9 extends from an outlet of the sheet feeding cassette 8 to the image transfer part at an upper portion of the photosensitive medium 1.

The upper transport path 9 is formed into a U-shape to surround the developing unit 3, and a pair of intermediate rollers 10 for transporting record sheets are provided near a lower inlet portion of the upper transport path 9. At an upper outlet portion of the upper transport path 9, a pair of registration rollers 11 are provided to control the timing of sheet feeding. The record sheets which are accommodated in the sheet feeding cassette 8 are sent one by one to the lower inlet of the upper transport path 9 by a feed roller 12 which is provided at an outlet of the sheet feeding cassette 8. The record sheet is transported from the lower inlet of the path 9 to an upper side of the developing unit 3 by the intermediate rollers 10. The record sheet is further fed to the image transfer part in a synchronous manner with the visible toner image on the photosensitive medium 1 by the registration rollers 11, thereby carrying out the transferring of the visible image. An adsorption fan 14, a fixing unit 15, and a sheet ejection tray 16 are provided in a record sheet path after transferring is completed. The record sheet to which the visible image is transferred is separated from the photosensitive medium 1, and is sent to the fixing unit 15 while being held on the side of the adsorption fan 14. The record sheet to which the visible toner image is fixed by the fixing unit 15 is ejected to the sheet ejection tray 16. This embodiment employs a drum type photosensitive medium as the latent image carrier. Obviously, a belt-driven type photosensitive medium may be used instead, which is described with another embodiment below.

Figure 2:
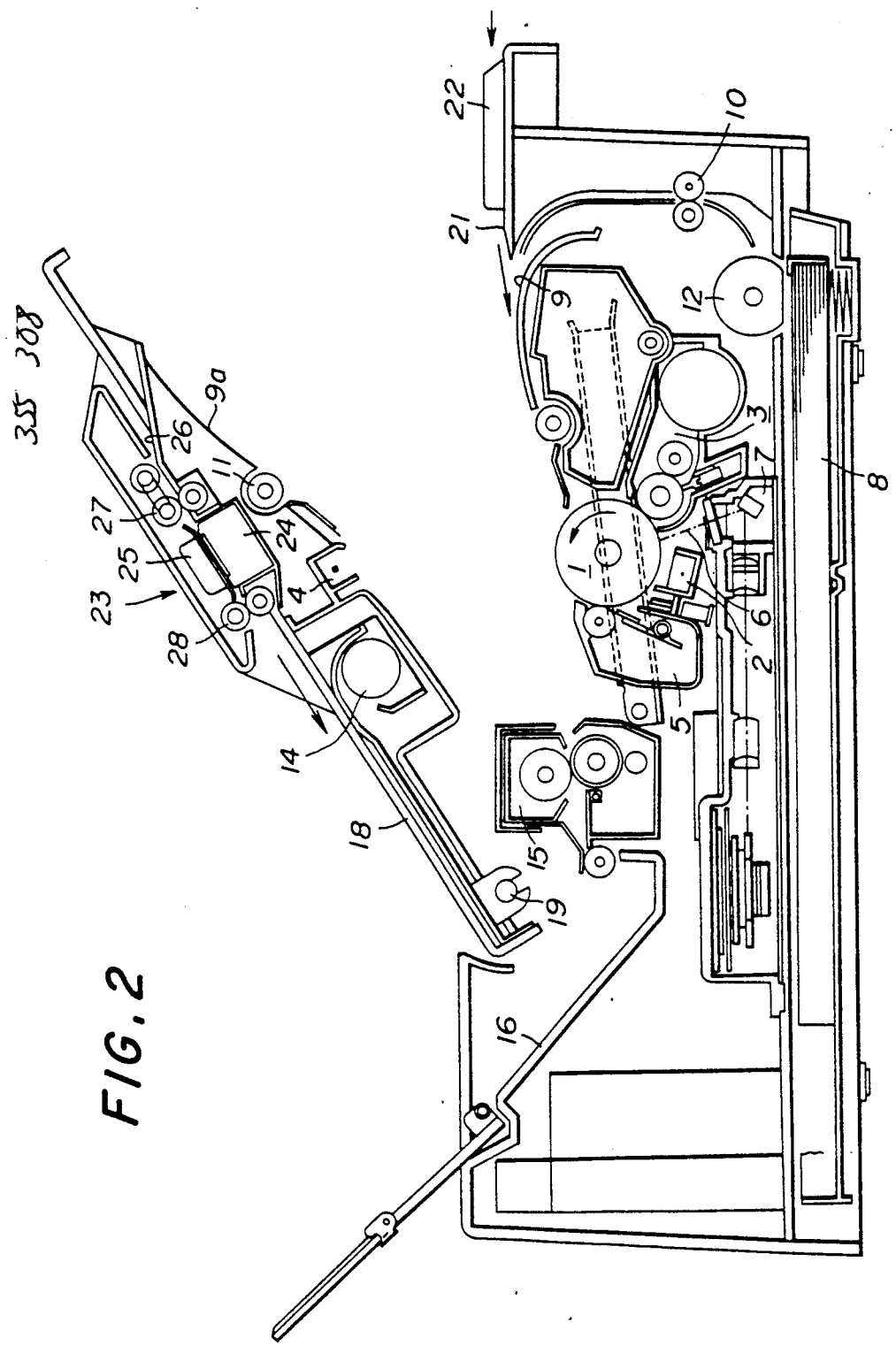
FIG. 2 is a sectional side view of the laser printer having the scanner unit shown in FIG. 1, with its upper cover in an open position.

As shown in FIG. 2, an upper cover 18 of the laser printer is rotatably supported around a shaft 19 on a lower part of the printer so that the upper cover 18 is rotatable around the shaft 19 up and down between an open position shown in FIG. 2 and a closed position shown in FIG. 1. The transfer charger 4 is fixed to the upper cover 18, and an upper-side roller which constitutes a pair of the registration rollers 11 is also mounted to the upper cover 18. Therefore, these components are moved together with the upper cover 18 to make the upper transport path 9 open to the external of the printer when the upper cover 18 is in the open position. Further, an upper guide plate 9a which constitutes an upper-side wall of the upper transport path 9 is mounted to the upper cover 18, and similarly this upper guide plate 9a is moved together with the upper cover 18 to make the upper transport path 9 open to the external of the printer when the upper cover 18 is in the open position. In this embodiment, the fixing unit 15 is mounted to the lower part of the printer, and the fixing unit 15 therefore is not moved together with the upper cover 18. However, in a modified embodiment, the fixing unit 15 may be mounted integrally to the upper cover 18, allowing the fixing unit 15 to be moved with the upper cover 18 when in the open position. At an upper front portion of the printer, a manual sheet feeding path 21 for sending manually a record sheet is provided. At an inlet portion of the manual sheet feeding path 21 a sheet guide plate 22 is provided to project slightly in a horizontal direction from the upper front portion of the printer, and at an outlet portion of the path 21 the manual sheet feeding path 21 joins an intermediate portion of the above-described upper transport path 9.

As shown in FIGS. 1 and 2, within the upper cover 18, a scanner unit 23 for reading image information of an original is provided. An image reading part 24 which is a main component of the scanner unit 23 is provided above the upper transport path 9 when the upper cover 18 is in the closed position. An image reading guide plate 25 is arranged on an upper side of the image reading part 24, so that the image reading guide plate 25 is opposed to the image reading part 24. This embodiment employs a fixed type device for the image reading part 24. For example, a contact type sensor or a small-sized type sensor comprising a charge-coupled device (CCD) and an optical system is used for the image reading part 24. On an inlet side of the image reading part 24, an original feeding path 26 is provided to extend slantingly upward from the outlet of the sheet guide plate 22. And a number of transport rollers 27 are provided in the original feeding path 26 at the inlet portion of the image reading part 24. In this case, the sheet guide plate 22 being used for guiding a record sheet to the upper transport path 9 is in common used as an original guide plate for guiding an original to the scanner unit 23. On an outlet portion of the image reading part 24, a pair of transport rollers 28 are provided to transport the original passing the image reading part 24 to a top surface of the upper cover 18. Therefore, the top surface of the upper cover 18 is used as an original ejecting part where the original passing the scanner unit 23 is ejected from the outlet of the scanner unit 23.

In this embodiment, the scanner unit 23 for reading image information of an original is installed within the upper cover 18 which is mounted removably to the lower part of the printer. Accordingly, the selection of the upper cover or the exchange between the upper cover having the scanner unit and that having no scanner unit would allow a clear identification of the printer specifications which include, for example, the specifications with and without the scanner unit. This enables the assembly operations concerning several printer models to be smoothly carried out in the assembly line. And, in this embodiment, an original sheet is sent to the scanner unit 23 from the inlet of the sheet guide plate 22 which is initially designed to introduce a record sheet to the upper transport path 9 via the manual sheet feeding path 21. Thus, the sheet guide plate 22 in the manual sheet feeding path 21 is in common used as an original guide plate for guiding the original to the scanner unit 23. This allows the commonization of the component parts and space within the printer. Further, in this embodiment, the original passing the scanner unit 23 is transported to the top surface of the upper cover 18 where the original ejection part is formed. The top surface of the upper cover 18 is in common used as the original ejecting part, thus commonizing the parts and space within the printer.

Next, referring to FIG. 3, a description will be given of a second embodiment of a laser printer having a scanner unit according to the present invention. In this embodiment, the original feeding path 26 serving for sending the original to the scanner unit 23 is provided to form a path selecting lever 29. The path selecting lever 29 is rotatably supported on a shaft so that the path selecting lever 29 swings between first and second positions. The first position indicated by a phantom line in FIG. 3 is selected when a record sheet is transported manually to the upper transport path 9 of the printer, while the second position indicated by a solid line in FIG. 3 is selected when an original is transported to the scanner unit 23.

Figure 3:
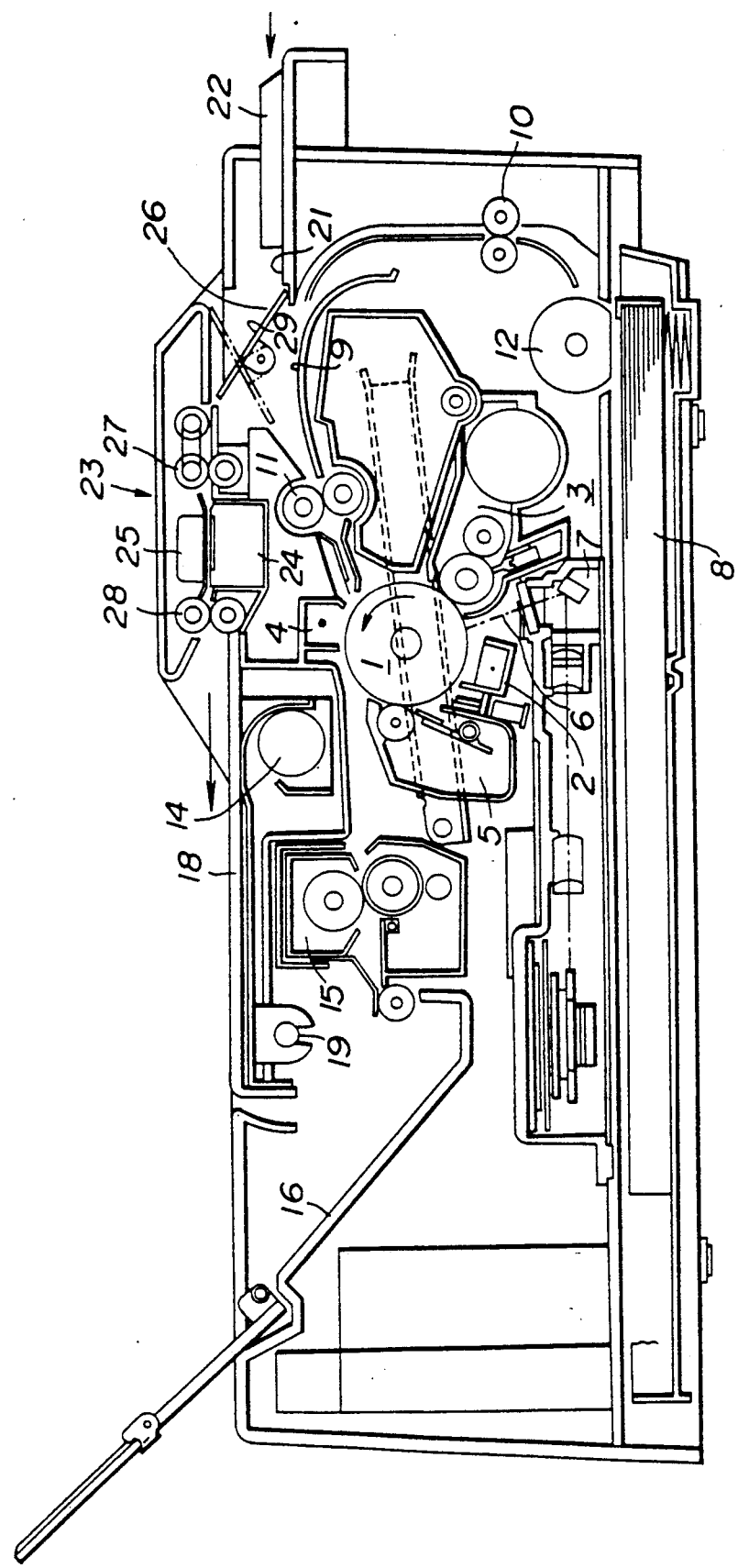
FIG. 3 is a sectional side view of a second embodiment of a laser printer having a scanner unit according to the present invention.

In a manual feeding mode when a record sheet is manually fed to the transfer part of the printer, the path selecting lever 29 is at the first position indicated by a phantom line in FIG. 3, and a record sheet one by one is sent from the sheet guide plate 22 to the upper transport path 9 through the manual sheet feeding path 21, with the aid of the path selecting lever 29. Meanwhile, in an original reading mode when image information of an original is read by the scanner unit 23, the path selecting lever 29 swings to the second position indicated by a solid line in FIG. 3, an original one by one is sent from the manual guide plate 22 to the image reading part 24 through the manual transport path 21 and through the original guide path 26, so that the image information of the original is read by the image reading part 24. After the image reading is done, the original is transported from the image reading part 24 to the top surface of the upper cover 18 which serves as an original ejecting part. The swinging motion of the path selecting lever 26 is interlocked with a mode selecting operation which is carried out to select a mode between the manual feeding mode and the original reading mode. This interlocking mechanism employs, for example, a magnet which is electrically activated and deactivated for swinging the path selecting lever 26 between the first and second positions. In this embodiment, it is possible to perform safely and accurately a manual sheet transport operation in the manual feeding mode as well as an original sheet transport operation in the original reading mode, because the path selecting lever 29 swings between the first and second positions to guide the record sheet to the upper transport path 9 or the original sheet to the scanner unit 23.

Figure 4:
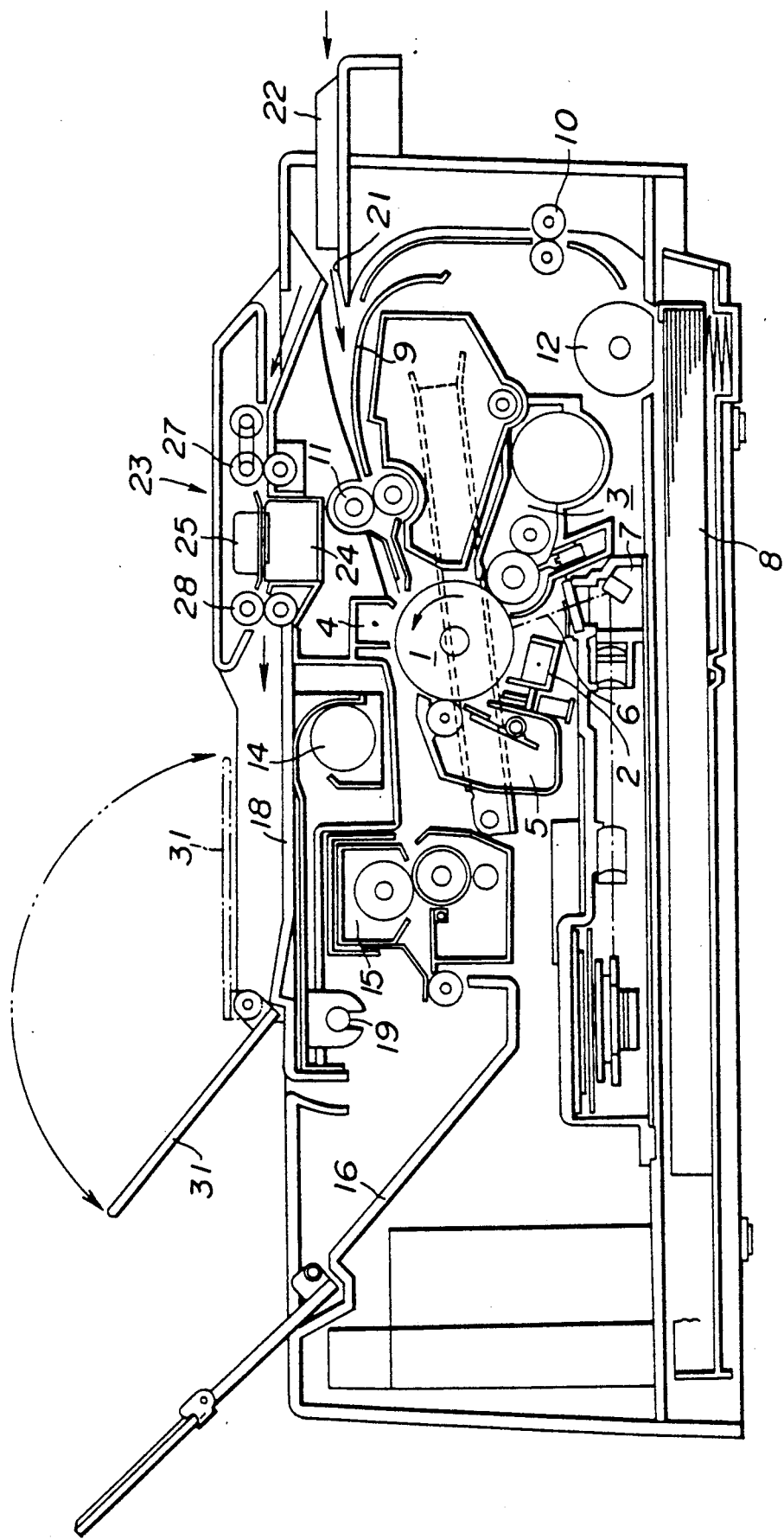
FIG. 4 is a sectional side view of a third embodiment of a laser printer having a scanner unit according to the present invention.

Next, a description will be given of a third embodiment of a laser printer having a scanner unit according to the present invention, by referring to FIG. 4. In this embodiment, the upper cover 18 which serves to stack originals ejected from the scanner unit 23 on the top surface of the upper cover is provided with a foldable original ejecting guide plate 31. The original ejecting guide plate 31 is mounted foldably on the upper cover 18 so that the original ejecting guide plate can be set between a stretched position indicated by a solid line in FIG. 4 and a folded position indicated by a phantom line in FIG. 4. When the image information of the original is read using the scanner unit 23, the original ejecting guide plate 31 is set to the stretched position. When the scanner unit 23 is not used or the upper frame 18 is opened to the external of the printer, the original ejecting guide plate 31 is set to the folded position. According to this embodiment, it is possible to send an excessively long original to the scanner unit smoothly.

Figure 5:
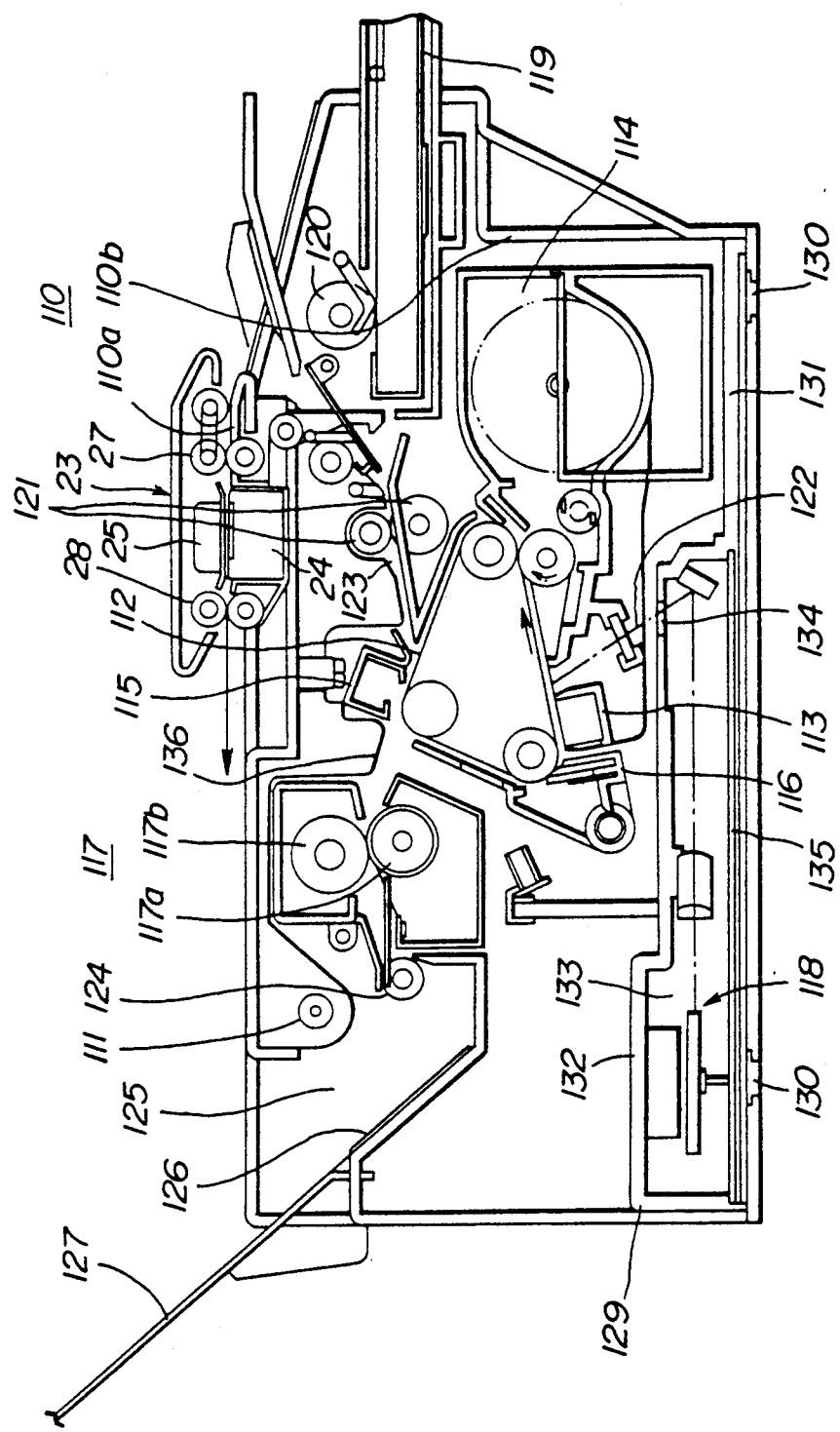
FIG. 5 is a sectional side view of the laser printer having the scanner unit shown in FIGS. 1 and 2, which includes a belt-driven type photosensitive medium.
Figure 7:
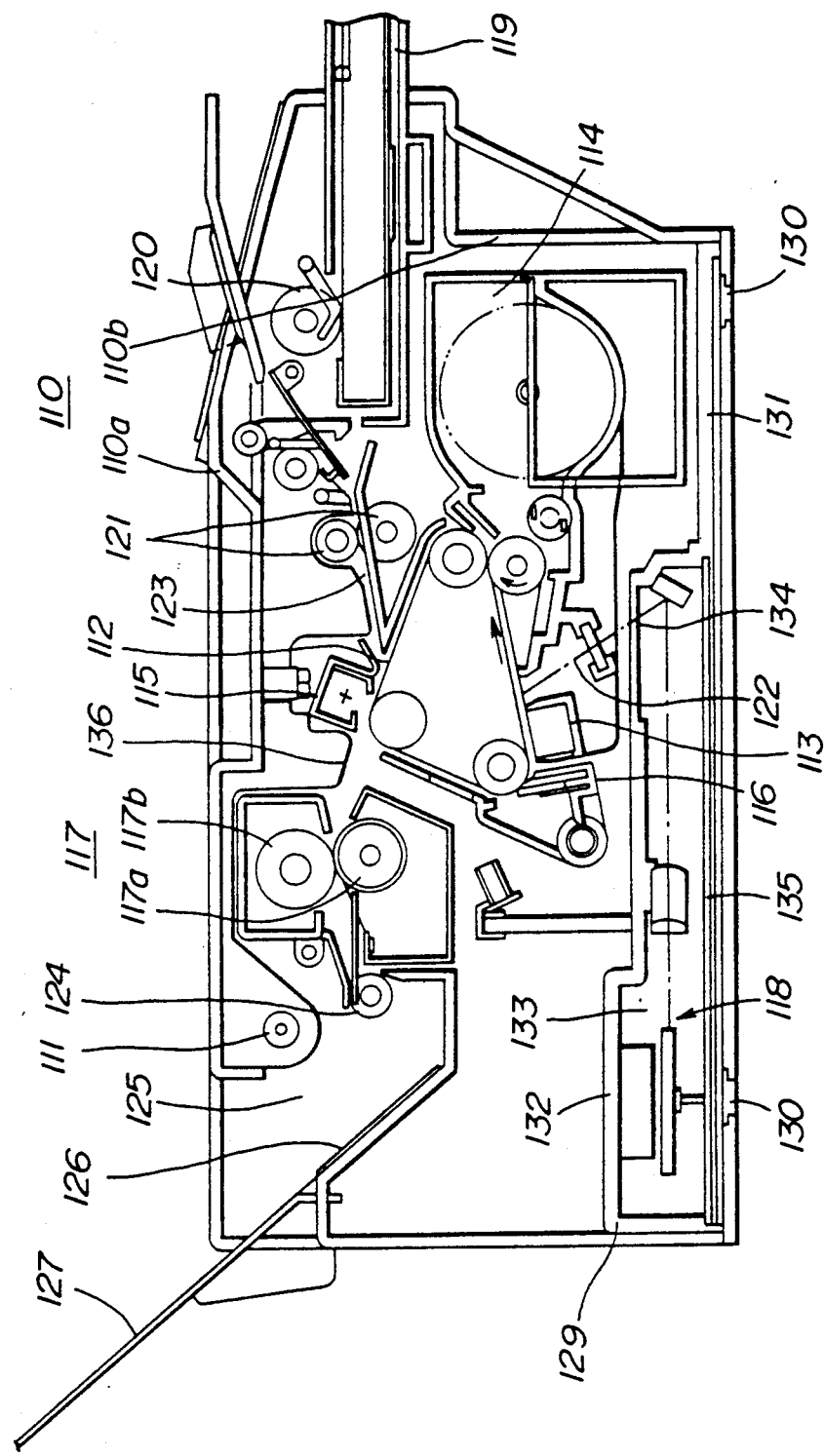
FIG. 7 is a sectional side view of a conventional laser printer having no scanner unit which includes a belt-driven type photosensitive medium.

Next, a description will be given of another embodiment of a laser printer having a scanner unit according to the present invention, by referring to FIGS. 5 and 7. FIG. 5 shows the fourth embodiment of a laser printer having a scanner unit according to the present invention, wherein there are provided a belt-driven type photosensitive medium in the midst of the printer and an automatic sheet feeding cassette at an upper front portion of the printer, and the other structure of the printer is generally the same as shown in FIGS. 1 and 2. FIG. 7 shows a conventional laser printer having no scanner unit.

In the embodiment shown in FIG. 5, a belt-driven type photosensitive medium 112 is provided in a laser printer 110, and a sheet feeding cassette 119 is arranged at an upper front part of the printer 110. The printer 110 is made up of an upper structure 110a and a lower structure 110b. The upper structure 110a is mounted rotatably around a shaft 111 on the lower structure 110b. The photosensitive medium 112 is driven to rotate in a direction indicated by an arrow in FIG. 5 and serves as an electrostatic latent image carrier. Around the belt-driven type photosensitive medium 112, an electrostatic charger 113, a developing unit 114, a transfer charger 115, and a cleaning unit 116 are arranged in this order in the rotating direction of the photosensitive medium 112. On an upper front side of the printer 110, a sheet feeding cassette 119 is provided. On a lower side of the printer 110, a laser optical system 118 is provided. A pair of registration rollers 121 are provided to control the timing of sheet feeding. The record sheets which are accommodated in the sheet feeding cassette 119 are sent one by one to a portion of the upper transport path 123 on an upper side of the photosensitive medium 112 by the registration rollers 121. The record sheet is transported to the electrostatic charger 113 and the surface of the record sheet is uniformly charged by the electrostatic charger 113. A laser optical path 122 is provided at a place between the electrostatic charger 113 and the developing unit 114. A laser beam sent from the laser optical system 118 passes in the optical path 122 and is cast on the photosensitive medium 112 for the exposure to make a latent image on the surface of the photosensitive medium 112. The latent image on the photosensitive medium 112 is developed with a toner into a visible image when it passes the developing unit 114.

The transfer charger 115 is provided above the photosensitive medium 112, and an image transfer part which is formed with the transfer charger 115 is arranged at an upper portion of the photosensitive medium 112. An upper transport path 123 extends from an outlet of the sheet feeding cassette 119 to the image transfer part at an upper portion of the photosensitive medium 112. The transfer charger 115 transfers the visible image produced by the developing unit 114 to the reverse side of the sheet at an upper portion of the photosensitive medium 112. And the cleaning unit 116 removes residual toner from the surface of the photosensitive medium 112 after the image is transferred to the record sheet. A fixing unit 117 and a sheet ejection tray 127 are provided in a record sheet path after transferring is completed. The record sheet to which the visible image is transferred is separated from the photosensitive medium 112, and is sent to the fixing unit 117 with the aid of a transport guide 136 and is held between a fixing roller 117a and a pressure roller 117b to fix the visible image. The record sheet which passes the fixing unit 117 is ejected to a sheet ejecting part 125 by a sheet ejecting roller 124. And the record sheet is further fed to the sheet ejection tray 127 with the aid of a sheet ejecting guide 126.

In this embodiment, the laser optical system 118 is provided at a position under a base cover 129 of the printer 110. The base cover 129 is provided at a bottom portion of the printer 110, and a side cover is formed integrally with or separately from the base cover. Most of the above-described components of the printer are directly or indirectly supported on the base cover and the side cover. The base cover 129 is made from a heat-insulating thermosetting resin or the like. Transversely extending foot portions 130 are provided in parallel at the bottom of the base cover 129. A flat portion 131 of the base cover 129 is formed to connect the foot portions 130 to the base cover 129. Upwardly bulging portion 132 extends from the flat portion 131 of the base cover 129. Inside the portion 132, a space 133 is formed. And a transversely extending slit 134 is formed in the portion 132 opening to the space 133 which opens to the downward direction. Within the space 133 in the base cover 129, several components which make up the laser optical system 118 are provided by mounting them on the base cover 129. With the components of the laser optical system 118 mounted, a lid plate 141 is attached to the bottom of the base cover 129 to close the downward opening of the space 133. At an upper front portion of the laser printer adjacent to the above-described upper transport path 123, a scanner unit 23 for reading image information of an original is provided. This portion of the laser printer is along the upper transport path 123. An image reading part 24 which is a main component of the scanner unit 23 is provided adjacent to the upper transport path 123. A sheet guide plate 25 is arranged at an upper position which is opposed to the image reading part 24. And a number of transport rollers 27 are provided on an inlet side of the image reading part 24. On an outlet side of the image reading part 24, a pair of transport rollers 28 is provided to transport the original passing the image reading part 24 to a top surface of the upper structure 110a of the printer.

Figure 6:
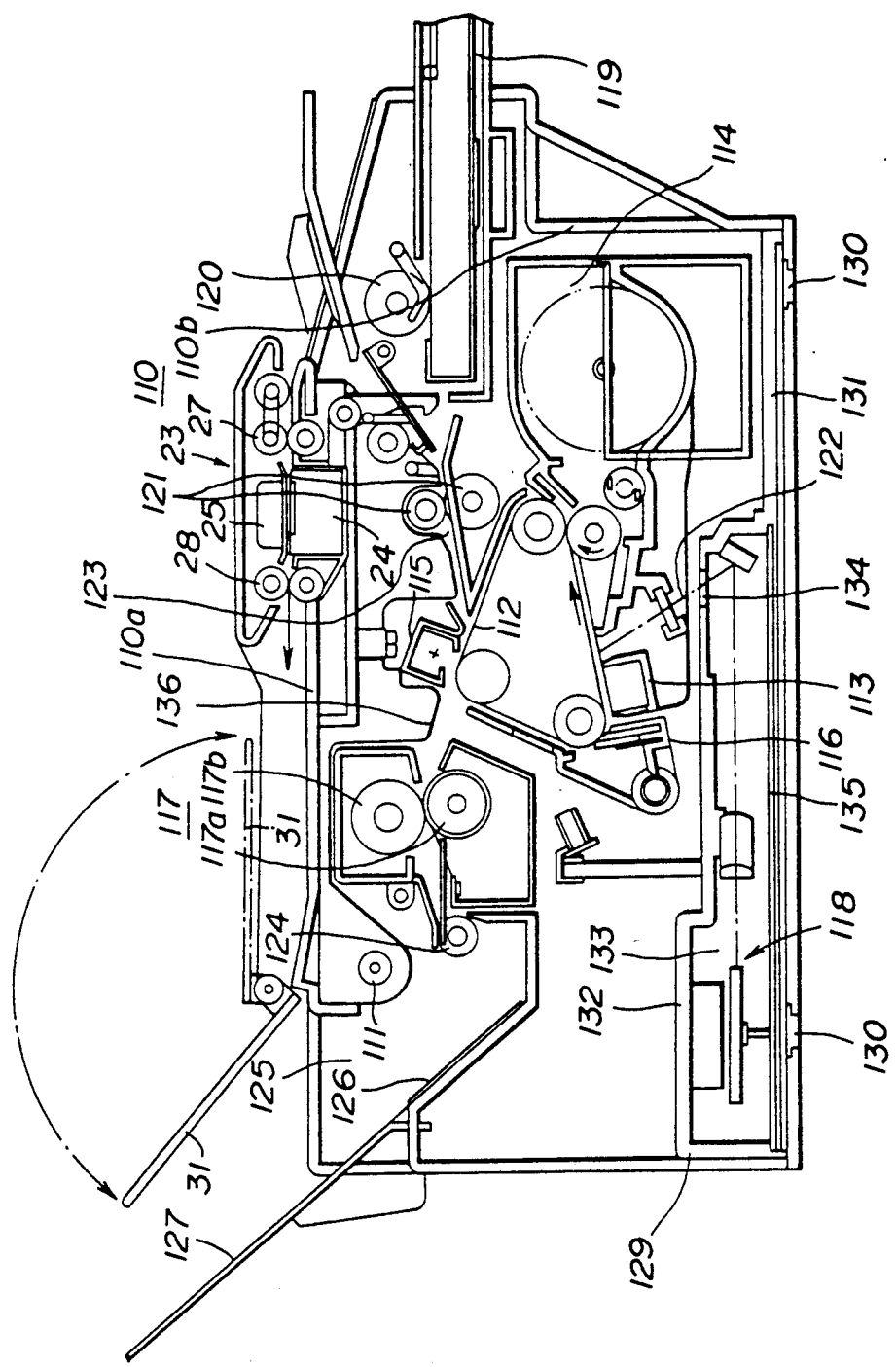
FIG. 6 is a sectional side view of the laser printer having the scanner unit shown in FIG. 4, which includes a belt-driven type photosensitive medium.

FIG. 6 shows a still another embodiment of a laser printer having a scanner unit according to the present invention. In this embodiment, the overall construction of the printer is substantially the same as shown in FIG. 5, except that a foldable original ejecting guide plate 31 similar to that shown in FIG. 4 is provided on the top surface of the upper structure 110a of the printer 110. FIG. 7 shows a conventional laser printer having no scanner unit.

As described above, according to the present invention, it is possible to make good use of the space within the printer which is created when the upper transport path 123 is formed within the printer and at the same time the scanner unit is incorporated in the printer, allowing an inexpensive cost of the scanner built-in printer and a compact size of the printer.

Further, the present invention is not limited to these embodiments, but various variations and modifications may be made without departing from the scope of the present invention.

What is claimed is:

1. A sheet transport apparatus of a printer including an automatic sheet feeding part, a manual sheet feeding part, a transfer part, an upper cover, a photosensitive medium and a scanner unit, said printer serving to write information on a record sheet through transferring of an image on the photosensitive medium to the record sheet by said transfer part, said record sheet being sent from the automatic sheet feeding part to the transfer part, said scanner unit serving to read image information of an original, said transfer part being provided at an upper portion of the photosensitive medium, said sheet transport apparatus comprising:

an upper transport path for transporting said record sheet from the automatic sheet feeding part to the transfer part, said upper cover being provided to allow the upper transport path to be opened for access thereto from outside the printer;

a manual transport path extending from an inlet portion of the manual sheet feeding part, said manual transport path serving to send manually a record sheet from the manual sheet feeding part to the transfer part and joining an intermediate portion of the upper transport path;

a first transport path where the scanner unit is provided, said first transport path being provided within the upper cover;

an original feeding path for transporting an original from the inlet portion of the manual sheet feeding part to the scanner unit; and path selection means provided at said intermediate portion of the upper transport path, said path selection means being switched between at a first position and at a second position and being arranged for guiding a sheet passing the manual sheet feeding part to the first transport path leading to the scanner unit when the first position is selected by the path selection means and arranged for guiding a sheet passing the manual sheet feeding part to the upper transport path leading to the transfer part of the printer when the second position is selected by the path selection means;

whereby said manual sheet feeding part is selectively usable both for feeding originals to said scanner unit and for manually feeding a sheet to said transfer part.

2. The sheet transport apparatus as claimed in claim 1, wherein the sheet transport apparatus further comprises a number of first driving means for transporting the original to the scanner unit, and second driving means for transporting the original from the scanner unit to the first transport path.

3. A sheet transport apparatus of a printer which has an automatic sheet feeding part, a manual sheet feeding part, a transfer part, an upper cover, a photosensitive medium and a scanner unit, said printer serving to write information on a record sheet through transferring of an image on the photosensitive medium to the record sheet by the transfer part, said record sheet being sent from the automatic sheet feeding part, said scanner unit serving to read image information of an original, said transfer part being provided at an upper portion of the photosensitive medium, said sheet transport apparatus comprising:

an upper transport path for transporting said record sheet from the automatic sheet feeding part to the transfer part;

a manual transport path extending from an inlet portion of the manual sheet feeding path, said manual transport path serving to send manually a record sheet from the manual sheet feeding part to the transfer part and joining an intermediate portion of the upper transport path;

a first transport path where the scanner unit is provided, said first transport path being provided within the upper cover;

first driving means for transporting a sheet to the scanner unit;

second driving means for transporting a sheet from the scanner unit tot he first transport path; and path selection means provided at said intermediate portion of the upper transport path, said path selection means being switched between at a first position and at a second position and being arranged for guiding a sheet passing the manual sheet feeding part to the first transport path leading to the scanner unit when the first position is selected by the path selection means and arranged for guiding a sheet passing the manual sheet feeding part to the upper transport path leading to the transfer part of the printer when the second position is selected by the path selection means, said path selection means selecting the first position when an original passes the manual sheet feeding part and selecting the second position when a record sheet passes the manual sheet feeding part.

4. The sheet transport apparatus as claimed in claim 3, wherein the path selecting means has a path selecting lever, a magnet and a shaft, said path selecting lever being rotatably supported on said shaft and being switched by activation and deactivation of said magnet between a first selecting position and a second selecting position, said first selecting position being selected when the second record sheet is manually sent to the upper transport path, and said second selecting position being selected when the original is transported to the original ejecting path.

5. A sheet transport apparatus of a printer which has an automatic sheet feeding part, a manual sheet feeding part, a transfer part, an upper cover, a photosensitive medium and a scanner unit, said printer serving to write information on a record sheet through transferring of an image on the photosensitive medium to the record sheet by said transfer part, said record sheet being sent from the automatic sheet feeding part, said scanner unit serving to read image information of an original, said transfer part being provided at an upper portion of the photosensitive medium, said sheet transport apparatus comprising:

an upper transport path for transporting said record sheet from the automatic sheet feeding part to the transfer part;

a manual transport path extending from an inlet portion of the manual sheet feeding part, said manual transport path serving to send manually a record sheet to the transfer part and joining an intermediate portion of the upper transport path;

a first transport path where the scanner unit is provided, said first transport path being provided within the upper cover;

an original feeding path for transporting the original from the inlet portion of the manual sheet feeding part to the scanner unit;

first driving means for transporting a sheet to the scanner unit;

second driving means for transporting a sheet from the scanner unit to the first transport path; and path selection means provided at said intermediate portion of the upper transport path, said path selection means being switched between at a first position and at a second position and being arranged for guiding a sheet passing the manual sheet feeding part to the first transport path leading to the scanner when the first position is selected by the path selection means, and arranged for guiding a sheet passing the manual sheet feeding part to the upper transport path leading to the transfer part of the printer when the second position is selected by the path selection means, said path selection means selecting the first position when an original passes the manual sheet feeding part and selecting the second position when a record sheet passes the manual sheet feeding part, wherein said first transport path comprises an original ejecting path for guiding an original from the scanner unit, said original ejecting path branching from a second position where the upper transport path and the manual transport path join, and a top surface of the upper cover is formed as an original ejection part where the original is ejected from the scanner unit.

6. The sheet transport apparatus as claimed in claim 5, wherein the sheet transport apparatus further includes a foldable original ejecting guide plate which is mounted foldably on the upper cover, allowing the original ejecting guide plate to be set between a stretched position and a folded position, the original ejecting guide plate being set to said stretched position when the scanner unit is used, and the original ejecting guide plate being set to said folded position when the scanner unit is not used.

* * * * *